May 30, 1967  F. S. GENBAUFFE  3,322,922
PROGRAM SWITCH FOR A CONTROL SYSTEM
Original Filed Nov. 2, 1961  5 Sheets-Sheet 1

INVENTOR
FRANCIS S. GENBAUFFE

BY  *Robert L. Marbin*

ATTORNEY

INVENTOR
FRANCIS S. GENBAUFFE
Robert L. Marben
ATTORNEY

May 30, 1967     F. S. GENBAUFFE     3,322,922
PROGRAM SWITCH FOR A CONTROL SYSTEM
Original Filed Nov. 2, 1961     5 Sheets-Sheet 2
*Fig. 4.*
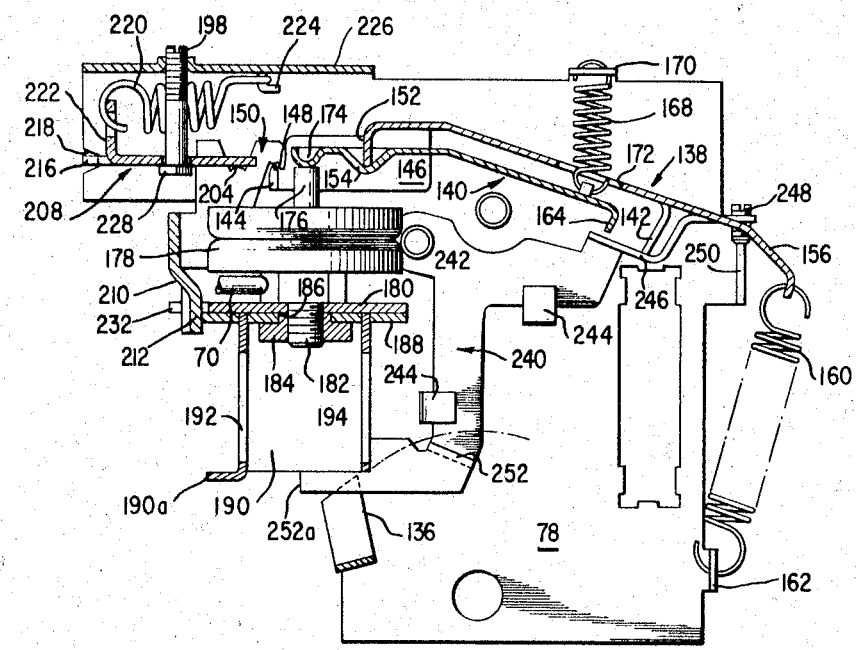
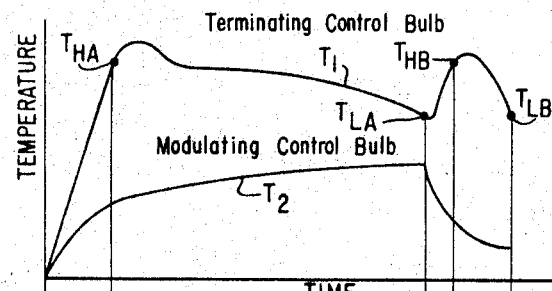
*Fig. 10.*
| Term. Control Terminal No | OFF | STEP 1 | STEP 2 | S.3 | STEP 4 | OFF |
|---|---|---|---|---|---|---|
| 92 b | op. | closed | open | cl. | open | open |
| 94 b | op | closed | closed | op. | open | open |
| 96 b | op. | closed | closed | cl. | closed | open |
INVENTOR.
FRANCIS S. GENBAUFFE
BY
ATTORNEY

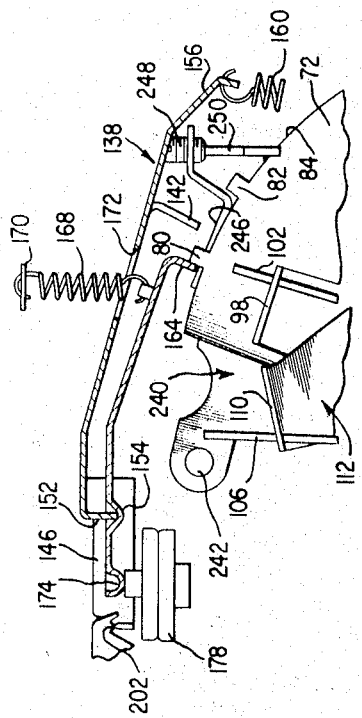
Fig. 7. STEP 2
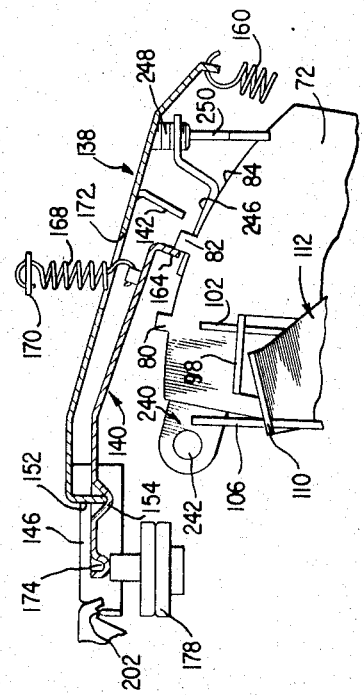
Fig. 9. STEP 4
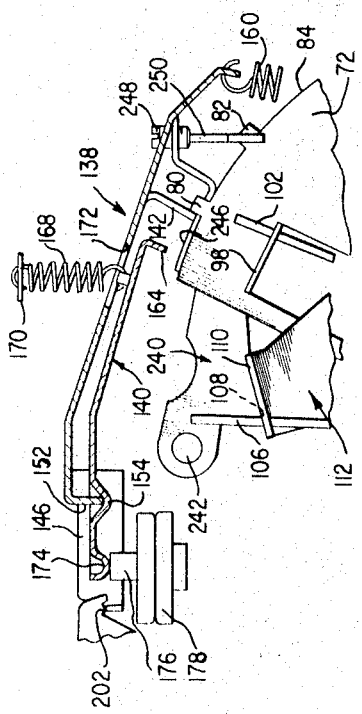
Fig. 6. STEP 1
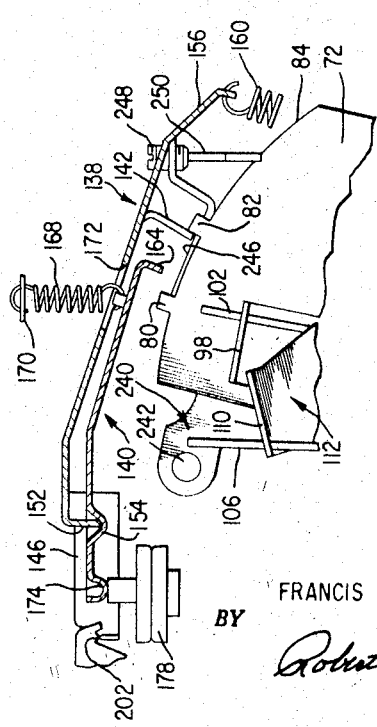
Fig. 8. STEP 3
INVENTOR.
FRANCIS S. GENBAUFFE
BY
ATTORNEY

United States Patent Office 3,322,922
Patented May 30, 1967

3,322,922
PROGRAM SWITCH FOR A CONTROL SYSTEM
Francis S. Genbauffe, Irwin, Pa., assignor to Robertshaw Controls Company, a corporation of Delaware
Original application Nov. 2, 1961, Ser. No. 149,738. Divided and this application Oct. 6, 1965, Ser. No. 545,174
5 Claims. (Cl. 200—140)

This application is a divisional application of application Ser. No. 149,738 filed Nov. 2, 1961, which in turn is a continuation-in-part of my copending application Ser. No. 773,429, filed Nov. 12, 1958.

This invention relates to clothes dryer control systems, and more particularly, to a program switch for a control system for operating a clothes dryer to automatically perform a preselected multistep clothes drying program in response to temperature variations within the dryer.

It is a primary object of the invention to provide a control system for automatically operating a clothes dryer through a clothes drying cycle in response to temperature variations at selected points within the dryer.

It is another object of the invention to provide a control system for operating a clothes dryer through a heated drying step in which the temperature of air applied to the clothes to be dried is automatically regulated in accordance with the degree of dryness of clothes.

It is another object of the invention to provide a control system for operating a clothes dryer through a drying cycle including a heated drying step and a subsequent cool-down period in response to variations in temperature at selected points within the dryer.

Still another object of the invention is to provide a program control mechanism for a clothes dryer providing a thermostatically regulated cool-down period.

Still another object of the invention is to provide a clothes dryer control system for thermostatically controlling the operation of a clothes dryer in any of a plurality of different drying cycle programs.

Still another object of the invention is to provide a program switch movable to selected positions in step-by-step movement in response to variations in temperature within the dryer.

Still another object of the invention is to provide a program switch for use in a clothes drying control system which may be manipulated to stop operation of the clothes dryer at any point within the drying cycle.

The foregoing and other objects are achieved in a clothes dryer which is provided with temperature sensing means located within the dryer to sense the temperature of air at a first location before the air enters the drying chamber and at a second location in the path of air flow after the air leaves the drying chamber. The temperature sensing device which senses the temperature of air after it leaves the drying chamber is connected to control the heating device which heats air entering the drying chamber in a fashion such that the temperature of air at the dryer outlet is maintained substantially constant during operation of the heater.

By controlling the heater in the foregoing manner, the air entering the drying chamber is heated to a temperature which is automatically regulated in accordance with the degree of dryness of clothes contained within the drying chamber. During the initial stages of operation, when the clothes are quite damp, the evaporation of moisture within the drying chamber extracts a substantial amount of heat from the air flowing through the dryer chamber, and the air heater is operated during this portion of the cycle to heat the air entering the drying chamber to a maximum temperature. As the clothes become dryer, the amount of heat extracted from the air during its passage through the chamber decreases and hence the air outlet temperature begins to rise. This rise in air outlet temperature is employed to reduce the rate of heating of air entering the inlet and thus air is supplied to the clothes at a temperature in accordance with their degree of dampness. This method of control eliminates the inflexibility of a timed drying cycle, and further eliminates the requirement that a person operating the dryer correctly adjust the dryer in accordance with the type of clothes or articles being dried.

The control system is designed to perform a drying cycle which normally includes a heated drying step which is subsequently followed by a cool-down period. During the cool-down period, the dryer blower is employed to supply an air flow through the drying chamber while the heater is shut off. This program is established by the use of a program switch which is connected to operate the blower and to turn the heater on or off as desired. The switch is constructed in the general form of a pawl and ratchet assembly in which five rest positions of the ratchet member are provided. The pawl assembly is manipulated so that when the switch is originally set at its cycle initiate position, it advances in step-by-step movement to its normal or off position. In each intermediate rest position, various contacts are made in an electrical circuit to energize the control elements in the appropriate manner. Control of the step-by-step movement of the program switch is in response to the temperature of air adjacent the dryer inlet. This air temperature is employed to expand or contract an element in the switch to manipulate the pawl mechanism to permit the ratchet to advance in step-by-step movements initiated either by an increase in air inlet temperature or a decrease in air inlet temperature. The switch is also employed to control an auxiliary heater located adjacent the temperature responsive element in the dryer area and, during that period in which the main dryer heater is not operated, step-by-step movement of the switch is under the control of the auxiliary heater which is, in turn, controlled by the switch itself.

Other objects and features of the invention will become apparent by reference to the following specification and to the drawings.

In the drawings:

FIG. 4 is a subassembly of the switch of FIG. 2, with certain parts in section and others omitted for clarity;

FIG. 6 is the detailed view of certain parts of the switch of FIG. 2 showing the switch in one position;

FIG. 7 is a view similar to FIG. 6 showing the switch parts in another position;

FIG. 8 is a view similar to FIG. 6 showing the switch parts in still another position;

FIG. 9 is a view similar to FIG. 6 showing the parts of the switch in still another position;

FIG. 10 is a generalized part of air temperatures existing at the dryer inlet and the dryer outlet versus time.

Figure 1:
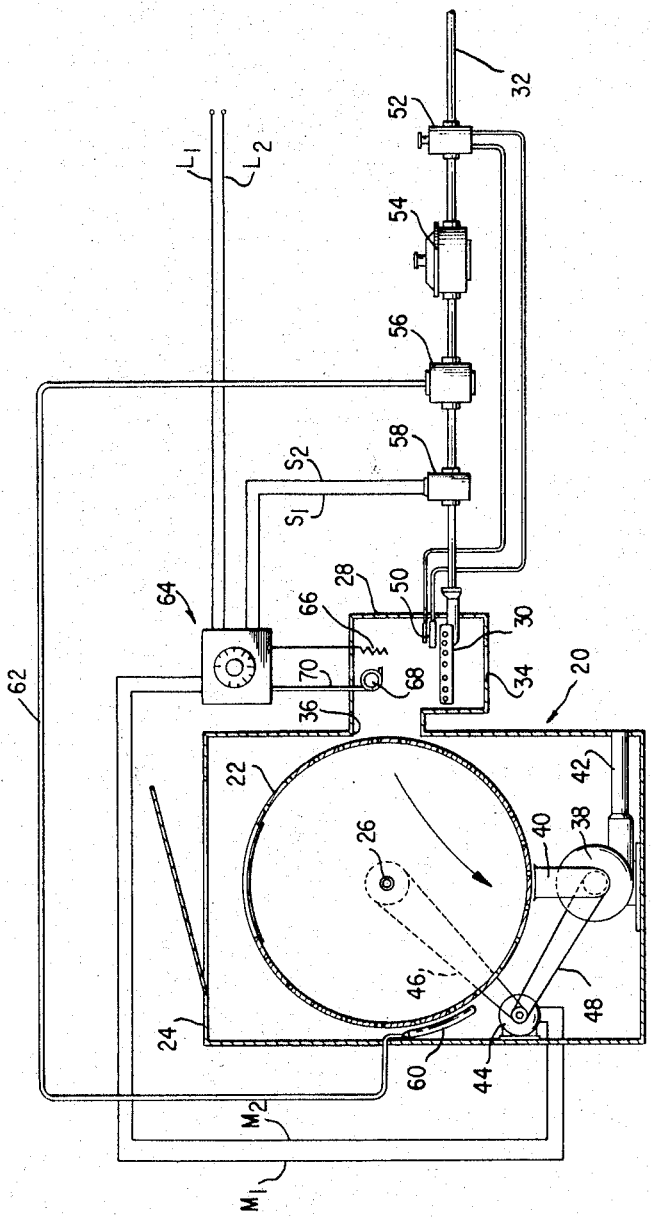
FIG. 1 is a schematic diagram showing a clothes dryer having a control system embodying the present invention.

A clothes dryer, designated generally 20, employing a control system embodying the present invention is disclosed schematically in FIG. 1 of the application drawings. Dryer 20 includes a generally cylindrical perforated dryer drum 22 mounted within a cabinet 24 for rotation about a central axis represented by a bearing assembly such as 26. Cabinet 24 is constructed to include a burner box 28 within which is mounted a fuel burner 30 connected to a suitable fuel supply, not shown, such as a gas main, by a supply line 32. Burner box 28 is formed with an air inlet opening 34 and opens into the interior of cabinet 24 adjacent the drum as at 36. A blower 38 having an intake 20 located adjacent the drum periphery is mounted within the cabinet to induce a flow of air through the dryer drum, the general path of air flow being into burner box 28 at inlet 34, thence past burner 30 and through opening 36 into the interior of the drum and thence through blower intake 40 through the blower 38 and out of the cabinet through a blower outlet 42. Drum 22 is driven in rotation by a drive motor 44 as by a belt and pulley arrangement designated generally 46 while a second belt and pulley arrangement designated generally 48 is connected between motor 44 and blower 38 so that blower 38 is operated to induce a flow of air through drum 22 while the drum is being driven in rotation by motor 44.

Flow of fuel to burner 30 and to its pilot 50 is controlled by a series of valves connected in supply line 32. The first of these valves is a safety pilot valve 52 which functions to control pilot 50. A pressure regulating valve 54 is connected in supply line 32 between safety pilot 52 and a modulating control valve 56. Modulating valve 56 is operated, in a manner to be described in more detail below, to adjust or vary the rate of flow of fuel through supply line 32 to burner 30, while pressure regulating valve 54 cooperates with modulating valve 56 in a manner such that the pressure of fuel supplied to modulating control valve 56 is maintained substantially constant regardless of the adjusted flow rate setting of valve 56. A solenoid operated shut-off valve 58 is connected in supply line 32 between modulating control valve 56 and burner 30. Valve 58 is a normally closed valve which is opened when its solenoid is energized through electric supply lines S-1 and S-2.

Modulating control valve 56 is automatically adjusted to regulate the rate at which fuel is supplied to burner 30, and hence the heat output of the burner, in accordance with the requirements or degree of dryness of the clothes contained in drum 22 by a control bulb 60 which is located within cabinet 24 to respond to the temperature of air which has passed through drum 22. Bulb 60 is of a well known type of construction and contains a charge of temperature responsive fluid which expands and contracts in response to variations in temperature to which the bulb is exposed. A conduit 62 connects bulb 60 to modulating control valve 56. The internal structure of valve 56 is such that when the temperature sensed by bulb 60 rises above a selected temperature, the expansion of fluid within bulb 60 and line 62 is applied to valve 56 in a manner such that the valve is operated to reduce the rate of flow of fuel to burner 30, thus reducing the heat output of the burner.

To briefly outline the functioning of modulating control valve 56 during a normal drying cycle, at the beginning of a drying cycle, the clothes contained within drum 22 are quite damp. As the heated air flows through the drying drum, the moisture in the clothes evaporates at a maximum rate, thus absorbing a maximum amount of heat from the heated air flowing through drum 22. Assuming a given temperature of air entering the drum inlet, it is apparent that because of the relatively large amount of heat absorbed from the air by the damp clothes, the temperature of the air as it leaves the drum will be at a minimum. During this period of time, bulb 60 is at or below its selected set point temperature. As the clothes become drier due to the continued evaporation of moisture, the amount of heat absorbed from the air as it passes through the drum begins to decrease, and with the inlet air temperature maintained at the initial constant temperature, the outlet air temperaure sensed by bulb 60 begins to rise. When the outlet air temperature reaches the selected set point temperature, the expanding fluid within bulb 60 and conduit 62 operates valve 56 to reduce the rate of fuel to burner 30, thus reducing the inlet air temperautre. Since the action of modulating control valve 56 in reducing the rate of flow of fuel to burner 30 is basically that of restricting the flow passage within supply line 32, the reduction of flow of fuel through line 32 would thus tend to cause an increase of pressure within line 32 to the right of valve 56 as viewed in FIG. 1. The pressure within fuel line 32 upstream of valve 56 is restored to its initial pressure by the action of pressure regulator 54, and thus, throughout the drying cycle, valve 56 is continuously adjusted by bulb 60 in cooperation with pressure regulator 54 to supply fuel to burner 30 at a rate which is continuously adjusted in a manner tending to maintain the temperature sensed by bulb 60 at a substantially constant selected temperature.

Motor 44 is an electric motor of conventional construction which is energized through motor supply lines M-1 and M-2. Motor supply lines M-1 and M-2, and solenoid supply lines S-1 and S-2 of shut-off valve 58 are connected to an electrical power source represented by supply lines L-1 and L-2 through a drying cycle program switch assembly designated generally at 64. In addition to motor supply lines M-1 and M-2 and solenoid supply lines S-1 and S-2, main supply lines L-1 and L-2 may, at certain times within the cycle, be connected to energize an auxiliary heater in the form of an electrical resistance heater 66. Auxiliary heater 66 is located within burner box 28 closely adjacent a second temperature responsive control bulb 68 which is located within burner box 28 to be responsive to the temperature of air adjacent drum inlet 36. Bulb 68 is generally similar in principle to bulb 60 and is connected by a conduit 70 to structure within program switch assembly 64 to operate the switch in step-by-step movement, in a manner described in greater detail below, to electrically energize one or more of the control elements represented by motor 44, solenoid control valve 58 and auxiliary heater 66 at selected points within the cycle.

Figure 3:
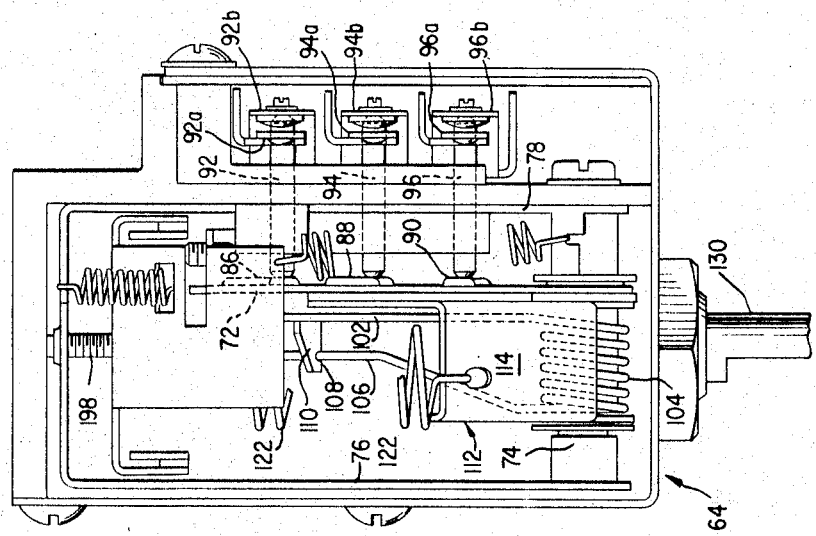
FIG. 3 is an end view of the switch of FIG. 2 with certain parts broken away or omitted.

Details of program switch assembly 64 are shown in FIGS. 2 through 9 of the drawings. Assembly 64 is basically a pawl and ratchet mechanism, the ratchet member taking the form of a generally sector shaped cam plate 72 supported for pivotal movement upon a pivot shaft 74 which in turn is supported in spaced frame side plates 76 and 78. A pair of spaced ratchet teeth 80 and 82 project outwardly from edge surface 84, edge surface 84 lying on a circular arc centered on the axis of pivot shaft 74. Three series of cam projections, 86, 88 and 90 are formed to project from one side surface of cam plate 72, each series of projections 86, 88 and 90 extending along circular arcs lying at different radial distances from the axis of shaft 74. As best seen in FIG. 3, three switch operating plungers 92, 94 and 96 are slidably supported in the assembly frame to close an associated set of electrical switch contacts when the respective plunger is engaged by a cam projection. Projection series 86 control plunger 92, projection series 88 control plunger 94 and projection series 90 control plunger 96. The function and purpose of the electrical switch contacts will be explained in greater detail below in connection with the description of the operation of the dryer.

Figure 5:
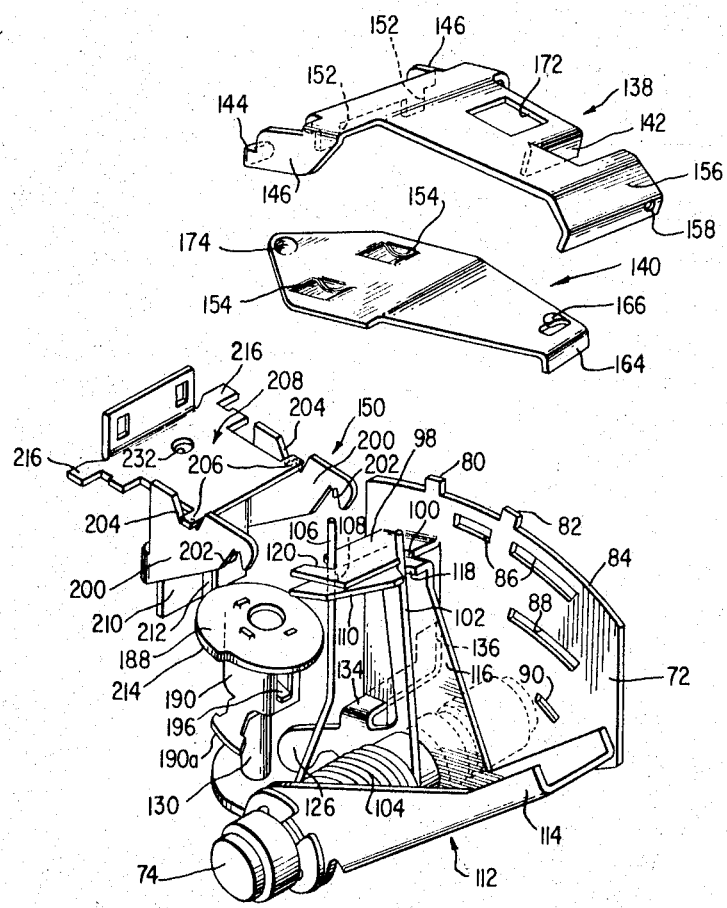
FIG. 5 is an exploded perspective view showing various elements of the switch of FIG. 2.

As best seen in FIG. 5, a portion of the main body of cam 72 is partially cut out and then bent up to form an arm 98 which projects laterally from one side of cam 72 in general parallelism with pivot shaft 74. A spring retaining notch 100 is cut into the rear edge of arm 98 to provide a seat for one leg 102 of a torsion spring 104 whose coils loosely surround pivot shaft 74. The opposite leg 106 of torsion spring 104 is received within a spring retaining notch 108 cut into the edge of an arm 110 of a reset lever assembly designated generally 112.

Reset lever assembly 112 is supported for pivotal movement about pivot shaft 74 at one side of cam plate 72 and, except for the resilient coupling exerted by torsion spring 104 between reset lever 112 and cam plate 72, the cam plate and reset lever can rotate upon pivot shaft 74 independently of each other. Reset lever assembly 112 includes a biasing leg 114 of generally channel shaped cross-section, the inner ends of the side flanges of leg 114 being suitably bored to receive pivot shaft 74. A second leg 116 projects radially from the axis of shaft 74, the upper end of leg 17 being bent over into general parallelism with shaft 74 to form arm 110. In the normal or rest position of the program switch assembly, cam plate 72 and reset lever assembly 112 are angularly disposed upon shaft 74 in the positions shown in FIGS. 2 and 5. Clearance notches such as 118 and 120 are cut into arm 110 and on reset lever 112 and arm 98 of cam plate 72 respectively so that legs 102 and 106 of the torsion spring may remain in engagement with their respective retaining notches 100 and 108. Reset lever assembly 112 is resiliently biased to the position shown in FIG. 2 by a tension spring 122 coupled between the outer end of biasing leg 114 and a fixed frame projection 124 (FIG. 2).

Figure 2:
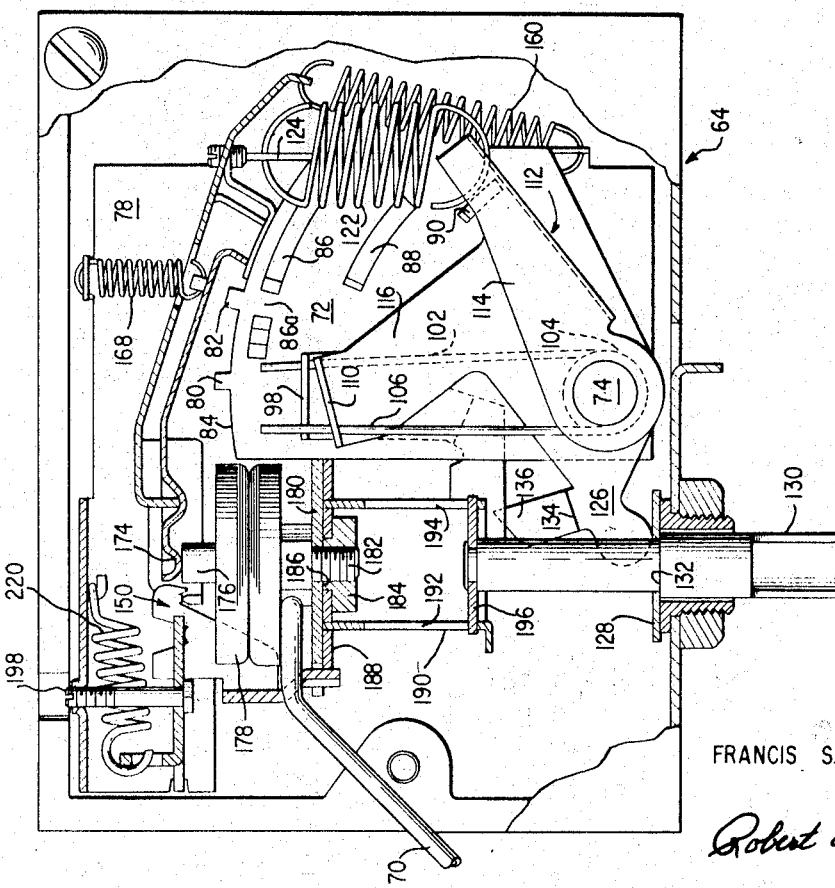
FIG. 2 is a cross sectional view with certain parts in section and others broken away or omitted of a program switch employed in the system of FIG. 1.

As best seen in FIG. 2, reset lever 112 further includes an actuating projection 126 which is resiliently urged by spring 122 into engagement with a washer 128 mounted upon a dial shaft 130. A shoulder 132 on dial shaft 130 engages the opposed side of washer 128 so that upward movement of shaft 130, as viewed in FIG. 2, may be employed to pivot reset lever assembly 112 in a clockwise direction about shaft 74 as viewed in FIG. 2. In addition to the structure described thus far, reset lever assembly further includes a second laterally projecting arm 134 (FIG. 5) which projects laterally past cam plate 72 to terminate in an upwardly projecting tang 136.

The structural details of program switch assembly 64 described thus far may be considered as constituting the ratchet portion of the assembly. Structural details of the pawl portion of the assembly are most clearly shown in FIGS. 4 and 5. Teeth 80 and 82 of cam plate 72 form the teeth of the ratchet and, to cooperate with projections 80 and 82, two floating pawl members designated generally 138 and 140 are employed.

The overall structural details of pawl assemblies 138 and 140 are best shown in FIG. 5, and before proceeding with a description of the manner in which the pawl assemblies are supported, the structural details of each pawl will be briefly reviewed. Pawl assembly 138 is formed from a piece of sheet material with a bent down tab portion forming the tooth 142 of pawl 138. Pawl assembly 138 is basically a lever having a fulcrum at one end, the fulcrum being formed by tabs such as 144 which project inwardly from opposed side flange portions 146 at the forward end of assembly 138. As best seen in FIG. 4, the upper edge of tabs 144 is formed with a knife edge 148, the knife edge constituting the fulcrum axis. Knife edge 148 bears upwardly against a downwardly facing surface on a fulcrum member 150 which will be described in greater detail below. A pair of downwardly projecting tabs 152 on pawl assembly 138 are adapted to be received within depressions 154 formed in pawl assembly 140 to define an axis of relative pivotal movement between the respective pawl assemblies. Pawl assembly 138 is projected rearwardly beyond tooth 142 as at 156, projection 156 being bored as at 158 to receive one end of a tension spring 160 connected between projection 156 and a suitably located tab 162 on side plate 78.

Pawl assembly 140 is formed with a downwardly projecting tab at its rearward end which defines the tooth 164 of pawl assembly 140. An upset hook portion 166 is provided near the rearward end of assembly 140 to receive one end of a tension spring 168 whose other end is coupled to a suitably located tab 170 on side plate 78.

Pawl assembly 138 is formed with an opening 172 through which spring 168 passes freely.

At the forward end of pawl assembly 140, a downwardly dished fulcrum projection 174 is formed to rest upon the upper end of a movable stud 176 of an expansible wafer assembly 178 which is connected by conduit 70 to temperature responsive control bulb 68 (see FIG. 1). Wafer 178 is fixedly mounted at its lower end upon a horizontal cross frame member 180 which is fixedly secured to and extends between frame side plates 76 and 78. Wafer assembly 178 is secured to frame member 180 by a downwardly projecting stud 182 which threadably receives a wafer mounting nut 184 having an upwardly projecting reduced diameter neck portion 186 which seats against the lower surface of frame member 180 to fixedly clamp wafer assembly 178 to the frame.

Reduced diameter neck portion 186 of nut 184 defines a rotatable support for a horizontal cam plate 188 which is secured to and rotatable with a cam driving cylinder 190. A pair of diametrically opposed vertically extending slots 192 and 194 slidably receive the opposite ends of a drive member 196 fixedly secured to the upper end of dial shaft 130. This coupling permits dial shaft 130 to move axially freely relative to cam cylinder 190 within limits determined by the upper and lower ends of slots 192 and 194 while at the same time maintaining a positive rotative coupling between dial shaft 130 and cam cylinder 190 at all times.

Cam 188 cooperates with a temperature calibration screw 198 to adjust the normal rest position of fulcrum member 150, to thereby determine the position of that fulcrum of pawl assembly 138 defined by knife edge 148 relative to movable stud 176 of wafer assembly 178. Referring to FIG. 5, it is seen that fulcrum member 150 is of generally U shape transverse cross section, the opposite legs of the U being in the form of arms 200, each having downwardly opening fulcrum notches 202 near their outer ends which receive knife edges 148 of pawl assembly 138. Approximately midway along the length of each arm 200, upwardly opening fulcrum notches 204 are formed to receive outwardly projecting fulcrum ears 206 of a temperature calibration lever designated generally 208. The central portion 210, of fulcrum member 150 which interconnects legs 200, projects downwardly and is formed with a vertically extending central ridge 212 which is held in engagement with the cam surface 214 of cam member 188 in a manner to be described below.

As best seen in FIG. 5, the end of temperature calibration member 208 remote from fulcrum ears 206 is formed with a second pair of fulcrum ears 216 which are pivotally received in fulcrum notches 218 in side frame members 76 and 78. A pair of tension springs 220 (FIG. 4) are interconnected between lugs 222 on calibration lever 208 and fixed projections such as 224 on a horizontally extending top cross frame portion 226 which is integral with and interconnects side frame members 78 to each other.

As best seen in FIG. 4, the action of tension springs 220 is such that calibration lever 208 is resiliently biased in a clockwise direction as viewed in FIG. 4 about the pivotal axis defined by the engagement between fulcrum ears 216 on member 208 and fulcrum notches 218 on the respective side frame members. Pivotal movement of member 208 in this last mentioned direction is limited by the engagement between the lower side of member 208 and a head 228 formed on the lower end of temperature calibration screw 198. Screw 198 passes freely through an opening 230 (see FIG. 5) in member 208. Thus, as seen in FIG. 4, the location of the axis of relative pivotal movement between member 208 and fulcrum member 150, which is defined by the interengagement between fulcrum ears 206 on member 208 within notches 204 in member 150, is determined by the position of temperature calibration screw 198. Neglecting the function of cam 188 for the moment, it is believed apparent that vertical adjustment of temperature calibration screw 198 upwardly or downwardly within cross frame member 226 would raise or lower the fulcrum point between members 208 and 150, which in turn would raise or lower the fulcrum point at knife edge 148 on pawl member 138.

On the other hand, assuming temperature calibration screw 188 to be located at a fixed setting, rotation of cam member 188 occasioned by manual rotation of dial shaft 130, would shift the lower end of fulcrum member 150 outwardly or inwardly relative to the axis of rotation of cam 188. The lower end of fulcrum member 150 is guided in this radial movement by the engagement between the sides of central portion 210 and a slot 232 cut in horizontal frame member 180. Radial inward or outward movement of the lower end of member 150 by rotation of cam 188 causes pivotal movement of member 150 about the pivotal axis established by the engagement between ears 206 and fulcrum notches 204 in fulcrum member 150, thus raising or lowering knife edge 148 relative to the movable stud 176 of wafer assembly 178.

It will be noted that the biasing action of spring 220 is transmitted through member 208 to member 150 at points 204 in an action such that the right hand end (FIG. 4) of member 150 is biased downwardly. The force exerted by spring 160 attached to pawl assembly 138 is applied through knife edge 148 to member 150 at points 202 in a direction urging the member upwardly. The rotative couple acting on member 150 by virtue of the two applied forces is such that the lower end of member 150 is held firmly against cam surface 214 of cam member 188.

Referring now particularly to FIG. 4, assuming that stud 176 of wafer assembly 178 is stationary, the force applied to pawl assembly 140 by tension spring 168 is one which urges pawl assembly 138 upwardly at the point of engagement of projection 152 on assembly 138 with fulcrum pocket 154 on pawl assembly 140. However, this upward force is resisted since knife edge 148 at one end of pawl member 138 is prevented from moving upwardly by its engagement with fulcrum member 150, while the opposite end of pawl assembly 138 is restrained against upward movement by the action of tension spring 160. Thus, pawl members 138 and 140 would normally tend to seek an equilibrium position at which the net upward biasing action of spring 168 and downward biasing action of spring 160 would be balanced at the point of contact between projection 152 and fulcrum pocket 154 on the respective pawl assemblies.

To accurately establish the normal rest position of both pawl assemblies relative to the path of movement of ratchet teeth 80 and 82 on cam member 72, a reset lever assembly designated generally 240 is pivotally mounted upon side plate 78 for movement relative to the plate about a pivot pin 242. The central or middle portion of reset lever 240 is in sliding engagement with the inner wall of side frame member 78 and is maintained in sliding engagement with member 78 as by tabs 244 bent outwardly from the plane of member 78. At its upper right hand end portion (FIG. 4), lever 240 is formed with a laterally projecting bracket tooth seat portion 246 which projects inwardly from side frame member 78 and terminates just short of engagement with the adjacent side cam plate 72. Pawl teeth 164 and 142 have sufficient lateral extent to overlap the path of ratchet teeth 80 and 82 and seat 246. As best seen in FIG. 4, the normal position of the pawl assembly is such that pawl tooth 142 of pawl member 138 normally rests on seat 246 while pawl tooth 164 is located somewhat above seat 246. The precise rest position of seat 246 relative to the path of movement of ratchet teeth 80 and 82 may be accurately adjusted by means of an adjustment screw 248 threaded through the outer end of seat 246 and bearing against the upper edge of a projection 250 on side member 78. From FIG. 4 it is believed apparent that spring 160 acts to resiliently bias screw 248 against the upper edge of projection 250 by virtue of the contact of pawl tooth 142 with seat 246. At the lower end of reset lever 240, a second lateral projection 252 projects laterally across the path of tang 136, and at the distal end of projection 252, an arm 254 extends toward cam cylinder 190 for purposes to be described below.

As described above, the function of program switch assembly 64 is to control, by opening or closing certain electrical contacts, motor 44, solenoid operated valve 58, and auxiliary heater 66 by turning the last three mentioned elements on or off at various points within the drying cycle. Referring now to FIG. 3, each of the last three mentioned elements is provided with a pair of switch contacts which, when closed, energize the associated element by connecting it across electrical supply lines L1 and L2. The uppermost plunger 92 is employed to control the opening and closing of switch contacts 92a and 92b which are connected across supply lines L1 and L2 in series with auxiliary heater 66. Contact 92a is a fixed contact while contact 92b is in the form of a leaf spring fixed at the end remote from the observer in FIG. 3. Plunger 92 passes behind fixed contact 92a as viewed in FIG. 3 and engages the leaf spring upon which contact 92b is mounted at a point in immediate contact 92b and the fixed mounting of the remote end of the leaf spring. When as shown in FIG. 3, plunger 92 contacts an elevated portion of the cam series 86, it pushes movable contact 92b outwardly to the right to break the contact between contacts 92a and 92b, thus deenergizing the auxiliary heater. When the left hand end of plunger 92 is not on an elevated portion of the cam series 86, the leaf spring upon which contact 92b is mounted biases the contact to the left into electrical contact with contact 92a, thus energizing the auxiliary heater 66.

A similar arrangement is employed with contacts 94a, 94b which control the solenoid of valve 58, and with contacts 96a and 96b which control operation of motor 44.

The program switch 64 functions to control motor 44, heater 66 and solenoid operated valve 58 in the following manner:

In the normal or unactuated condition of program switch 64, the various parts, and in particular cam member 72, are in the positions shown in FIGS. 2 and 4. To place the program control in operation, dial shaft 130 is pushed inwardly from the position shown in FIG. 2. The inward movement of dial shaft 130 is transmitted by shoulder 132 and washer 128 to projection 126 of the actuating lever assembly 112, thus causing lever 112 to rotate in a clockwise direction about the axis of pivot shaft 74 as viewed in FIG. 2. This pivotal movement of actuating lever 112 is transmitted by torsion spring 104 to cam 72 and cam 72 likewise begins to move in clockwise pivotal movement about shaft 74 until the rearward side of ratchet tooth 82 strikes pawl tooth 142. Pawl tooth 142 momentarily restrains further clockwise pivotal movement of cam 72, but actuating lever 112 continues to pivot in a clockwise direction about shaft 74, torsion spring 104 resiliently opposing the relative pivotal movement of the two parts. As actuating lever 112 continues to rotate in a clockwise direction, tang 136 on lever 112 moves into contact with laterally projecting portion 252 on reset lever 240 (FIG. 4) and pivots lever 240 in a counterclockwise direction about its pivot 242. This action causes seat 246 to move upwardly as seen in FIGS. 2 and 4 and carry both pawl teeth 164 and 142 upwardly clear of the path of ratchet teeth 80 and 82, thus permitting cam plate 72 to pivot, due to the biasing action of torsion spring 104, in a clockwise direction about shaft 74 until ratchet tooth 80 is rotated beyond the right hand side of pawl tooth 142. Dial shaft 130 is then released and driven outwardly by the action of spring 122 and pawl tooth 142 drops in front of ratchet tooth 80 as actuating lever 112 returns to its initial or FIG. 2 position, thus locating cam plate 72 in the position shown in FIG. 6.

With the cam plate in this position, the contact between plungers 92, 94 and 96 and their respective cam series 86, 88 and 90 is such that all plungers engage a flat portion on cam and thus all three sets of contacts are closed to energize auxiliary heater 66, motor 44 and the solenoid of solenoid valve 58. This action causes motor 44 to rotate dryer drum 22 and also to actuate blower 38 to induce a flow of air past gas burner 30 which is now ignited and supplied with gas through open solenoid valve 58. Bulb heater 66 is energized and the heating action of heater 66, combined with that of main heater 30, causes the temperature sensed by control bulb 68 to rise rapidly.

Referring now to FIG. 10, there is shown an approximate plot of the temperature T1 sensed by bulb 68 as a function of time, together with a plot of the temperature T2 sensed by bulb 60 as a function of time. Referring now particularly to the curve T1 of FIG. 10, when program switch 64 is in the FIG. 6 position, the temperature T1 sensed by bulb 68 rises rapidly since the air to which bulb 68 is exposed is being heated both by auxiliary heater 66 and burner 30, which is being operated at this time at a maximum heat output rate for reasons which will be developed below. This situation is represented on curve T1 by the relatively steep, substantially linear portion of the curve between the origin of the plot and the left hand point Tha on the curve. Because of this increase in temperature, the fluid within control bulb 68 expands and this expansion is applied to expansible wafer assembly 178 in a direction causing its movable stud 176 to move upwardly as viewed in FIG. 6. Upward movement of stud 176 first causes pawl assembly 140 to pivot in a clockwise direction about the pivotal axis defined by the inter engagement of projection 152 on pawl assembly 138 in fulcrum pocket 154 of pawl assembly 140. However, this pivotal movement is soon arrested by the engagement of pawl tooth 164 on pawl assembly 140 with seat 246 on reset lever 240. When pawl tooth 164 seats on seat 246, further upward movement of wafer stud 176 is now applied to pawl assembly 140 in a direction pivoting pawl assembly 140 in a clockwise direction about tooth 164, thus elevating fulcrum pocket 154 which in turn elevates projection 152 on pawl assembly 138. Elevating movement of projection 152 causes pawl assembly 138 to pivot as a unit in a counter clockwise direction about the fulcrum defined by the engagement between knife edge 148 and fulcrum member 150. This latter pivotal movement causes pawl tooth 142 of pawl assembly 138 to move upwardly until eventually pawl tooth 142 is disengaged from the left hand side of ratchet tooth 80, thus permitting cam plate 72 to swing toward the left as viewed in FIG. 6 under the action of torsio nspring 104 until the left hand side of ratchet tooth 80 engages pawl tooth 164 as viewed in FIG. 7. The specific temperature at which the disengagement of pawl tooth 142 from ratchet tooth 80 occurs is at Tha on curve T1 of FIG. 10.

When cam plate 72 is located in the FIG. 7 position, plunger 92 (FIG. 3) is in engagement with a raised portion of cam series 86, and thus pushes spring contact 92b out of contact with fixed contact 92a, thus opening the circuit to auxiliary heater 66. The remaining two sets of contacts 94a, 94b and 96a, 96b remain closed because their respective plungers do not engage an elevated portion of the associated cam series, and thus solenoid control valve 58 remains open and motor 44 remains in operation to continue rotation of dryer drum 22 and operation of blower 38.

Air heated by the continued operation of burner 30 flows through dryer drum 22 to assist in evaporating moisture from clothes or other articles within the drum. During the initial phases of operation of burner 30, the clothes within drum 22 are at a maximum dampness and, as the air heated by burner 30 flows past the damp clothes, a maximum amount of heat is absorbed from the air to evaporate the moisture from the clothes. Thus, while the air temperature at dryer inlet 36 is relatively high, as indicated by the curve T1 of FIG. 10, the temperature of air after it passes through the drum is relatively low and rises rather slowly as indicated by the curve T2 of FIG. 10. As the clothes become drier by the continued application of heated air, the rate of evaporation of moisture from the clothes begins to decrease with a corresponding decrease in the amount of heat withdrawn from the air during its passage through the dryer drum. With the temperature of air at a drum inlet substantially constant, this situation causes the temperature of air adjacent the drum outlet, or the temperature T2 sensed by bulb 60, to rise. The increase in temperature sensed by bulb 60 causes the fluid contained within the bulb and conduit 62 to expand and the expansion of the fluid is applied to modulating valve 56 in the fashion described above to reduce the rate of flow of gas to burner 30, thus tending to reduce the air temperature sensed by bulb 68 because of the somewhat throttled operation of the burner. Thus, as indicated in the curves of FIG. 10 as the temperature sensed by bulb 60 rises at a relatively slow rate, there is a corresponding reduction in the temperature T1 sensed by bulb 68. As an ideal condition, it would be desirable to keep the central portion of curve T2 flat, however, the response rate of the control system is such that T2 increases relatively slowly during this phase of the drying cycle and hence can be referred to only as substantially constant.

The foregoing throttling action of the fuel supply to burner 30 is continued until the temperature sensed by bulb 68 is reduced to a temperature T1a indicated on FIG. 10. As the temperature T1 decreases from Tha in FIG. 10 to the point, T1a, the fluid contained in control bulb 68 and its conduit 70 undergoes a corresponding reduction in volume, thus causing a movable stud 176 of wafer assembly 178 to move downwardly from the FIG. 7 position.

The first effect of this downward movement of the wafer stud is to permit pawl tooth 142 of pawl member 138 to move downwardly until it again engages seat 246. Further downward movement of wafer stud 176 causes pawl assembly 140 to pivot in a counterclockwise direction about the axis defined by the engagement between projection 152 on pawl assembly 138 and fulcrum pocket 154 on pawl assembly 140, this pivotal movement being encouraged by tension spring 168. Eventually, this last mentioned pivotal movement of pawl 140 lifts pawl tooth 164 upwardly out of engagement with ratchet tooth 80 and cam plate 72 moves one step to the left due to the reaction of torsion spring 102. This last mentioned leftward movement of cam plate 72 is halted when ratchet tooth 82 engages pawl tooth 142 of pawl assembly 138, the shift in position being from that shown in FIG. 7 to that shown in FIG. 8.

When cam plate 72 is in the FIG. 8 position, plunger 92 is again engaged with a flat portion of cam 72 thus again closing contacts 92a and 92b to again energize auxiliary heater 66. Plunger 94, however, is now in engagement with an elevated portion of cam series 88, thereby opening contacts 94a and 94b to de-energize the solenoid of valve 58, the valve 58 then closing to shut off the supply of gas to burner 30. Motor 44 remains energized.

With operation of burner 30 discontinued, the temperature sensed by modulating control bulb 60 decreases as indicated on the right-hand portion of the curve T2 of FIG. 10. Since bulb heater 66 is now energized, the temperature sensed by control bulb 68 begins to rise again, thereby expanding the fluid contained within bulb 68 and conduit 70 to cause wafer stud 176 to again move upwardly to return pawl tooth 164 into engagement with projection 246 and to subsequently disengage pawl tooth 142 from ratchet tooth 82 to cause cam plate 72 to step from the FIG. 8 position to the FIG. 9 position in the same fashion as previously described in connection with the shift from the FIG. 6 position to the FIG. 7 position. This shifting action again occurs when the temperature sensed by bulb 68 reaches temperature point T*hb* on FIG. 10, temperature T*hb* corresponding to temperature T*ha*.

When cam plate 72 is in the FIG. 9 position, contacts 92*a* and 92*b* are again opened to de-energize auxiliary heater 66. Contacts 94*a* and 94*b* are still held open because their associated plunger 94 is still in contact with a raised portion of cam series 88. Motor 44 remains energized. Since both main burner 30 and auxiliary heater 66 are now out of operation, the temperature sensed by bulb 68 drops fairly rapidly, thus causing movable stud 176 of wafer assembly 178 to again move downwardly to eventually lift pawl tooth 164 out of engagement with ratchet tooth 82, thereby permitting cam plate 72 to return to the original position shown in FIG. 2 under the action of torsion spring 104. The disengagement of pawl tooth 164 and ratchet tooth 82 occurs when the temperatured sensed by bulb 68 reaches point T1*b* on the T1 curve of FIG. 10, temperature T1*b* corresponding to temperature T1*a*. With cam plate 72 returned to its original position, all three plungers 92, 94 and 96 engage a raised portion of their respective cam series thus opening the three sets of switch contacts, leaving the auxiliary heater de-energized, the solenoid of valve 58 de-energized, thereby closing supply line 32, and also discontinuing the supply of the electric current to motor 44, thereby stopping rotation of dryer drum 22 and operation of blower 38.

The drying cycle described above is what may be termed a normal cycle consisting basically of five steps:

(1) *Cycle initiation.*—In this step auxiliary heater 66 is energized, solenoid control valve 58 is open, and motor 44 is energized.

(2) *Heated drying.*—In this step auxiliary heater 66 is off, solenoid control valve 58 is open with heater 30 controlled in accordance with air outlet temperature by bulb 60 and modulating valve 56, and motor 44 is energized.

(3) *First cool down period.*—Auxiliary heater 66 is energized, solenoid control valve 58 is closed to turn off main burner 30, and motor 44 is energized.

(4) *Second cool down period.*—Auxiliary heater 66 is de-energized, solenoid control valve 58 is closed and motor 44 is energized.

(5) *Cycle terminate.*—Auxiliary heater 66 is turned off, solenoid control valve 58 is closed, and motor 44 is deenergized.

Steps 1, 2, 3, and 4 outlined above are respectively initiated when program switch 64 is in the FIG. 6, FIG. 7, FIG. 8, and FIG. 9 positions, step 5 above finds the program switch in the FIG. 2 position.

Of the steps outlined above, step 2, the heated drying step is of the greatest interest. During this portion of the cycle, heated air is supplied to dryer drum 22 at an inlet temperature regulated in direct proportion to the degree of dampness of the clothes or other articles contained within the dryer drum. During the initial portions of the cycle, the inlet air temperature is relatively high and may be made so because the relative dampness of the clothes prevent this temperature from being harmful to the clothes. As the clothes begin to dry, the inlet temperature is reduced in direct proportion to the reducing dampness of the clothes within the dryer drum. This is accomplished by controlling the air inlet temperature by a temperature responsive means represented by bulb 60 which is responsive to the air outlet temperature—i.e. the temperature of air as it leaves the drum.

It is of primary importance to note that the active phase of the drying cycle—i.e., step 2—is regulated solely by the degree of dryness of the clothes, and is entirely independent of time. The control system remains in step 2 until the clothes at the desired degree of dryness regardless of whether a relatively short or relatively long time is required to achieve this desired degree of dryness. During this step, heat is applied continuously to the articles being dried at temperatures continuously regulated in accordance with the degree of dryness of the clothes to achieve a maximum rapidity of drying without applying undesirably high temperatures to the clothes within drum 22.

The foregoing mode of operation makes a cool down desirable and this is achieved by operating the auxiliary heater in the above-described manner during steps 3 and 4 outlined above. In order that this cool down period can be long enough to be effective, it is desirable that bulb 68 be relatively insensitive to temperature changes—i.e. bulb 68 should have a relatively slow response rate to temperature variations. Thus, by making bulb 68 relatively insensitive, and further by providing a two-step cool down period, the desired length of the cool down period can be prolonged. The relative insensitivity of bulb 68 for this latter purpose in turn makes the initial step 1 desirable to provide a period in which both main burner 30 and auxiliary heater 66 are operated so that heater 66 can supply additional heat to bulb 68 to accelerate the action of the bulb in reaching an equilibrium with the temperature of air as heated by main burner 30.

In certain instances, it is desirable to operate the dryer in a manner differing from the normal cycle described above. The two most generally desired alternative drying cycles are a so-called fluff tumble cycle and a so-called super-dry cycle. The fluff tumble cycle is generally used to tumble drapes or similar articles for a period of time without the application of heat for the primary purpose of removing accumulated dust. The super-dry cycle is generally employed to dry items which are extremely difficult to dry such as heavy bath mats or similar articles.

Figure 11:
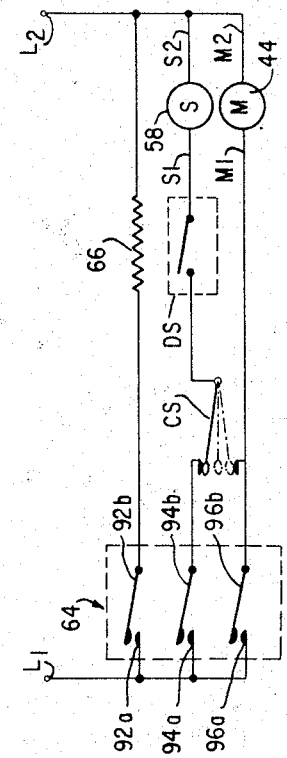
FIG. 11 is a schematic electrical diagram showing the connections of the program switch with various elements of the control system.

The control system described above may be easily adapted to perform the normal drying cycle described above, a fluff-tumble cycle or a super-dry cycle by connecting a 3-position cycle selector CS switch in line S–1 in the manner shown in FIG. 11. To perform the normal drying cycle described above, cycle selector switch CS is positioned as shown in FIG. 11, thus connecting the solenoid of solenoid operated valve 58 directly to contact 94*b*. With cycle selector switch CS in the described position, operation of the control system is as described above.

To condition the system to perform a super-dry cycle, cycle selector switch CS is shifted to the lowermost position indicated in broken line in FIG. 11 to connect line S1 of solenoid operated valve 58 to line M1 of motor 44. With cycle selector switch CS in this position, solenoid controlled valve 58 is open whenever motor 44 is energized, and thus gas is supplied to burner 30 throughout steps 1, 2, and 4 as outlined above. This basically differs from the normal drying cycle in that the cool down period established by steps 3 and 4 of the normal drying cycle are eliminated and an additional period of heating is applied to the articles in dryer drum 22, the additional heating period substituted for the cool down period of the normal drying cycle.

To set the control system to perform a fluff tumble cycle, cycle selector switch CS is positioned in an intermediate position in which line S1 is opened, thereby maintaining solenoid control valve 58 closed throughout the cycle. Since solenoid valve 58 remains closed, main burner 30 is never operated and the cycle proceeds entirely under the control of auxiliary heater 66. Heater 66 is effective only to heat the air in the locality of control bulb 68 and does not supply any significant amount of heat to the air which is circulated through dryer drum 22.

In the normal case, the control system is provided with a door switch DS connected in series in line S–1 to prevent operation of burner 30 in the event the dryer door is not closed.

If it is desired to stop operation of the dryer at any point during the drying cycle, this may be accomplished by rotating dial shaft 130 until a projection 190*a* on cam cylinder 190 is rotated against a projection 252a on reset lever 240. The direction of rotation is such that projection 190 would move away from the observer as viewed in FIG. 4. Thus, when projection 190 moves in contact with projection 252a, lever 240 is rotated about its pivot 242 in a counterclockwise direction as viewed in FIG. 4. This action causes seat 246 to be elevated, as viewed in FIG. 4, and the elevating movement of seat 246 carries pawl teeth 142 and 164 upwardly until both pawl teeth are lifted above the path of movement of ratchet teeth 80 and 82. Removal of the pawl teeth from the path of the ratchet teeth permits torsion spring 104 to resiliently return cam plate 72 to its rest position shown in FIG. 2.

While I have described one embodiment of my invention, it will be apparent to those skilled in the art that the disclosed embodiment may be modified. Therefore, the foregoing description is to be considered exemplary rather than limiting and the true scope of the invention is that defined in the following claims.

I claim:

1. A temperature responsive program switch assembly comprising a frame, a switch operating cam mounted on said frame for movement between a rest position and a ready position, means biasing said cam toward said rest position, a plurality of spaced ratchet teeth mounted on said cam for movement therewith along a predetermined path upon movement of said cam between said rest position and said ready position, a first pawl lever, first pivotal support means supporting said first lever at one end thereof for pivotal movement relative to said frame about a first axis, a first pawl tooth on said first lever adjacent the opposite end of said first lever movable into and out of the path of movement of said first ratchet teeth at a first location on said path upon pivotal movement of said first lever about said first axis, a second pawl lever, second pivotal support means supporting said second lever at one end thereof for pivotal movement relative to said frame about a second axis, a second pawl tooth on said second lever adjacent the opposite end of said second lever movable into and out of the path of movement of said ratchet teeth at a second location on said path upon pivotal movement of said second lever about said second axis, means interconnecting said first and said second pawl levers for pivotal movement relative to each other about a third axis extending parallel to said first and said second axes at a location between said axes and the respective pawl teeth, first spring means on said frame resiliently biasing said first pawl lever about said first axis in a direction urging said first pawl tooth into the path of movement of said ratchet teeth, second spring means on said frame resiliently biasing said second pawl lever about said second axis in a direction urging said second pawl tooth away from the path of said ratchet teeth, stop means on said frame engageable with each pawl tooth when the pawl tooth is located in the path of movement of said ratchet teeth to limit further pivotal movement of the associated lever toward the path of movement of said ratchet teeth, means for maintaining one of said pivotal support means at a stationary location relative to said frame, and temperature responsive means for shifting the other of said pivotal support means relative to said frame in response to variations in temperature to swing one of said pawl teeth about said third axis into engagement with said stop means and subsequently shift said third axis to withdraw the other pawl tooth the path of said ratchet teeth upon a continued increase in temperature and to swing said other pawl tooth about said third axis into engagement with said stop means and subsequently shift said third axis to withdraw said one of said pawl teeth from the path of said ratchet teeth upon a continued decrease in temperature.

2. A temperature responsive program switch assembly as defined in claim 1 further comprising means supporting said stop means for movement relative to said frame between a normal position wherein a pawl tooth engaged with said stop means is located in the path of movement of said ratchet teeth and a reset position wherein a pawl tooth engaged with said stop means is withdrawn from the path of movement of said ratchet teeth.

3. A temperature responsive program switch assembly as defined in claim 1 wherein said means for maintaining one of said pivotal support means stationary relative to said frame comprises means for locating said one of said pivotal support means at a selected adjusted stationary position relative to said frame.

4. A program switch assembly as defined in claim 3 further comprising an actuating member mounted in said frame for rotary and axial movement relative to said frame, means responsive to axial movement of said actuating member in a first direction for driving said cam from said rest position to said ready position, and means responsive to rotation of said actuating member for adjusting said maintaining means.

5. A temperature responsive program switch assembly as defined in claim 4 further comprising temperature calibration means operable to adjust said means for maintaining said one of said pivotal support means relative to said frame independently of said means responsive to rotary movement of said actuating member.

References Cited

UNITED STATES PATENTS

| 2,941,055 | 6/1960 | Sussin | 200—83 |
| 3,221,128 | 11/1965 | Lindberg | 200—140 |
| 3,249,723 | 5/1966 | Boxert | 200—83 |
| 3,277,249 | 10/1966 | Lyell | 200—6 |

BERNARD A. GILHEANY, *Primary Examiner.*

H. B. GILSON, *Assistant Examiner.*